United States Patent Office 3,835,073
Patented Sept. 10, 1974

3,835,073
SUSPENSION POLYMERIZATION PROCESS
David Everitt Thimas, Cwmbran, Wales, assignor to Monsanto Limited, London, England
No Drawing. Filed Dec. 3, 1973, Ser. No. 421,208
Claims priority, application Great Britain, Dec. 14, 1972, 57,661/72
Int. Cl. C08j 1/26
U.S. Cl. 260—2.5 B                 11 Claims

ABSTRACT OF THE DISCLOSURE

The process of the invention comprises polymerizing a vinylaromatic monomer in an aqueous suspension system in the presence of a suspending agent, a suspension polymerization catalyst and an alkyl hydrogen polysiloxane comprising the repeating unit

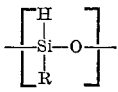

where R is an alkyl group having 1 to 4 carbon atoms.

BACKGROUND OF THE INVENTION

This invention relates to a suspension polymerization process useful in the production of beads of a vinylaromatic polymer.

It is often convenient that a vinylaromatic polymer be produced directly in the form of small beads and one way in which this can be done is provided by a suspension polymerization process. In this process a vinylaromatic monomer is added to water containing a suspending agent and the mixture agitated to obtain a suspension of small drops of the monomer in water. Polymerization in the presence of a suitable catalyst converts these drops into polymer beads.

Unfortunately, however, it generally happens that water droplets become occluded in the polymer beads during polymerization and these occluded water droplets may appear as small reservoirs from which the water seeps to wet the surface of the polymer bead. One of the advantages of suspension polymerization is that the polymer beads produced can be gravity fed or airveyed from one location to another. Handling equipment is often highly dependent, therefore, on free-flow properties and anything that leads to the formation of bead clusters is most undesirable as the equipment can become jammed thereby. It is found, however, that beads with wet surfaces tend to form such clusters very readily so a key step in the production of polymer beads by a suspension process is the drying of the beads after they have been separated from the suspension and washed. If this step in the process is too prolonged a severe penalty is imposed in terms of plant efficiency. It is, therefore, important that the incidence of occluded water in the beads, especially in the zones adjacent the bead surface be reduced to a minimum.

We have now discovered a process in which the incidence of occluded water especially in portions of the bead adjacent the surface can be much reduced.

SUMMARY OF THE INVENTION

The process of the invention comprises polymerizing a vinylaromatic monomer in an aqueous suspension system in the presence of a suspending agent, a suspension polymerization catalyst and an alkyl hydrogen polysiloxane comprising the repeating unit

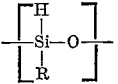

where R is an alkyl group having 1 to 4 carbon atoms.

DETAILED DESCRIPTION

One of the most widely used commercial applications of suspension polymerization is in the production of foamable polymer beads. In this process the polymerization is conducted in the presence of a volatile blowing agent which becomes incorporated in the bead. The present invention is particularly useful in such processes.

The alkyl group in the alkyl hydrogen polysiloxane is one having from 1 to 4 carbon atoms such as a methyl, ethyl, propyl or isobutyl group. Of these methyl hydrogen polysiloxane is the most preferred in practice.

The amount of the polysiloxane in the system, calculated as a percentage of the monomer weight, can be varied for maximum effectiveness in preventing water-occlusion and minimum effect on the physical properties of the polymer. The amount can be from 0.0001 to 0.008%, preferably from 0.0005 to 0.006% and most preferably from 0.003 to 0.006%.

The suspending agent used in the polymerization can be an inorganic water-insoluble salt such as tricalcium phosphate, aluminum oxide or magnesium silicate but it is found that the problem of occluded water is more acute where organic polymeric suspending agents such as carboxymethyl cellulose, gelatine, polyvinyl pyrrolidone and hydroxyethyl cellulose are used. This difficulty is often very serious where the suspending agent comprises a water-soluble organic polymer such as, for example, polyvinyl alcohol (hydrolyzed polyvinyl acetate) particularly when the suspending agent comprises 50% or more by weight of polyvinyl alcohol.

The process of the invention is preferably carried out in the presence of a suspension system which comprises a first suspending agent having the structure of a vinyl alcohol polymer or copolymer containing at least 95 mol percent of polymerized vinyl alcohol, and a second suspending agent having the structure of a vinyl alcohol copolymer containing from 75 to 91 mol. percent of polymerized vinyl alcohol.

In such a preferred process the weight of the first suspending agent is from 1 or 2 to 500 times, particularly from 2 to 100 times, that of the second. From 2 to 50 times is often very suitable. The aqueous suspension system can, for instance, contain from 0.01 to 1% preferably from 0.03 to 0.5% by weight of the first agent and from 0.001 to 0.5%, preferably from 0.002 to 0.1% by weight of the second agent, the relative weights of the two being within the range noted above, and the suspending agents need of course to be soluble in these amounts.

Where such a two-component system is used it is preferred that the first suspending agent has the structure of a homopolymer of vinyl alcohol or of a copolymer of vinyl alcohol and a vinyl ester of a lower fatty acid containing up to 5 mol. percent preferably from 0.5 to 5 mol. percent of polymerized vinyl ester, the balance being polymerized vinyl alcohol. It is also preferred that the second suspending agent has the structure of a copolymer of vinyl alcohol and an ester of a lower fatty acid containing from 9 to 25 mol. percent preferably from 9 to 15 mol. percent of polymerized vinyl ester, the balance being polymerized vinyl alcohol. The first and second suspending agents can be mixed together before addition to the aqueous suspension system or they can be added separately in either order.

In a particular preferred process there is a two stage addition of the suspending agent. The aqueous suspension system at the beginning of the reaction comprises first and second suspending agents as described above and, after completion of a portion of the polymerization, there is added from 0.005 to 2.0% of the weight of the total organic phase of a further suspending agent having the structure of a polymer or copolymer of vinyl alcohol, the polymerization being continued. Preferably, the further suspending agent is added in an amount corresponding to from 0.01 to 1.0% by weight of the total organic phase. It is preferably added at a point corresponding to a conversion of the vinylaromatic monomer to polymer of from 20 to 80%, for example, from 40 to 60% conversion of monomer to polymer.

Where the suspending agent comprises a copolymer of vinyl alcohol, the comonomer can be an inert monomer, which is preferably a vinyl ester of a lower fatty acid, that is to say of a saturated monocarboxylic acid containing up to four, and preferably two or three carbon atoms; vinyl acetate is a particularly preferred comonomer.

The molecular weight of the suspending agent can be chosen from a wide range. For example, the molecular weight can be such that a 4% by weight aqeous solution of the suspending agent has a viscosity of 1 to 75 centipoises.

Alterations in the quantity and composition of the suspending agent can often result in control over the average polymer particle size.

The vinylaromatic monomer polymerized according to the process of the invention can be, for example, styrene, α-methylstyrene, vinyltoluene, chlorostyrene or any other ring- or side-chain substituted vinylaromatic monomer as well as mixtures of such monomers and mixtures of one or more such monomers with a minor amount of a copolymerizable non-vinylaromatic monomer such as acrylonitrile, methacarylonitrile, and methyl acrylate or a polymer such as polybutadiene. In practice, however, the invention is most useful in producing beads of homopolystyrene.

After completion of the polymerization the suspension is usually filtered to separate the beads which are then dried. It is noticeable that the total drying time required for the beads prepared according to the process of the invention is often somewhat shorter than that necessary for beads prepared by a convertional process in which no polyalkyl hydrogen siloxane is added to the system.

One of the most widely used commercial applications of suspension polymerization is in the production of foamable polymer beads. In this process, the polymerization is conducted in the presence of a volatile blowing agent which becomes incorporated in the bead. The present invention is particularly useful in such processes.

In such cases the blowing agent incorporated in the bead during polymerization is a volatile blowing agent, that is to say a liquid that readily vaporizes when heated. Suitable volatile blowing agents include, for example, pentane, isopentane, hexane, heptane, cyclopentane, cyclohexane, cyclopentadiene or some other similar volatile hydrocarbon. The blowing agent can also be a petroleum ether boiling within the range 30° C. to 70° C. In most cases, however, the blowing agent is a pentane fraction. The amount of blowing agent incorporated in the polymer beads is conventionally up to 10%, such as from 3 to 10% and preferably from 4 to 8% by weight of the monomer.

The polymerization can employ the reaction conditions, catalyst systems and other additives normally used in such reactions. Thus, the temperature can be, for example, between 60° C. and 150° C. or higher and the pressure can be between 1 and 15 atmospheres. Catalysts that can be used include, for example, peroxy compounds such as cumene hydroperoxide, benzoyl peroxide, t-butyl peroctoate, di-t-butyl peroxide and acetyl benzoyl peroxide, alone or in conjunction with a reducing agent so as to set up a Redox system; azo compounds such as azobisisobutyronitrile can alternatively be used if desired. Among other additives that can be present are flame-retardants, dyes and lubricants. It is found that the effectiveness of such additives is not markedly affected by the use of the polysiloxane additive at the concentrations disclosed herein.

The invention is further illustrated in the following Example.

EXAMPLE 100 parts by weight of styrene monomer were polymerized in 111.5 parts by weight of water in the presence of (a) a suspending agent system comprising 0.1755 parts by weight of hydrolyzed polyvinyl acetate;
(b) a catalyst system comprising 0.36 parts by weight of benzoyl peroxide;
(c) a blowing agent that consisted of 6.6 parts by weight of pentane; and
(d) 0.0045 parts by weight of methyl hydrogen polysiloxane. (From Dow Corning Corporation, Midland, Michigan under the trade name Siloxane DC1107).

The polymer beads formed were washed. They contained 0.3% by weight of occulded water. Some of the water being present as droplets, the diameters of which were between 1% and 5% of the bead diameter. None of these occlusions were open to the bead surface. The beads were dried in a flash drier, screened into size fractions, airsparged to remove the occulded water and packed off into drums.

The beads having diameters from 1.05 to 2.3 mm were prefoamed to a 16 kg./cubic meter density and were conditioned for the block was found to be well fused and to meet the BS 3837 standard.

When the above process was repeated, omitting this time the methyl hydrogen polysiloxane from the suspension system, it was found that the beads contained 1.3 wt. percent of occluded water. Many of the beads contained relatively large droplets which were often in direct communication with the surface of the bead. The beads could not be dried satisfactorily as, on leaving the flash drier, the water began to seep from the occlusions onto the bead surface. The wetness of the bead surface made it difficult to sieve the beads efficiently and to flow them through the standard pipework to the hoppers. When a 1 meter x 1 meter x ½ meter block was molded from a prefoam of density 16 kg./cubic meter, the block cooling time was 32 minutes.

Inclusion of the polysiloxane additive was found to have no substantial adverse affect on the performance of the bead during foaming, in fact it even shortened the block cooling time by a small amount.

Siloxanes Having SiH Bonds

The alkyl hydrogen polysiloxane used in the present invention can be prepared by the methods disclosed in U.S. Pat. 3,249,585 and also in the publication *Silicones* by R. W. Meals and F. M. Lewis published by Reinhold Publishing Corporation of New York, N. Y. (1959), pages 128–130 and are hereby incorporated by reference. These are linear siloxane polymers containing the repeating unit

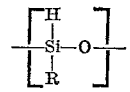

wherein R is a alkyl group hiving 1 to 4 carbon atoms. The polymers terminate in silyl group, e.g., $(CH_3)_3$ Si—. The polymers are fluid in nature and being polymeric have an average molecular weight consistent with a degree of polymerization of 3 to 300 units preferably 10 to 100, most preferably 30 to 40 as contained in Siloxane DC1107. The viscosities of these fluids can vary from 10 to 100,000 cstks., preferably 15 to 400 cstks.

It will be appreciated that, while the embodiments of the present invention as shown and described herein are necessarily limited to a few forms of the present invention, many variations and modifications thereof are feasible and practical without departing from the spirit and scope of the present invention disclosed and claimed herein.

What is claimed is:

1. A process for the production of beads of a vinylaromatic polymer which comprises polymerizing a vinylaromatic monomer in an aqueous suspension system in the presence of a suspending agent, a suspension polymerization catalyst and a linear alkyl hydrogen polysiloxane comprising the repeating unit

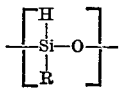

where R is an alkyl group having from 1 to 4 carbon atoms.

2. A process according to Claim 1, in which R is a methyl radical.

3. A process according to Claim 1, in which the amount of polysiloxane present in the aqueous suspension system is from about 0.0001 to 0.008% of the monomer weight.

4. A process according to Claim 1, in which the suspending agent comprises a water soluble organic polymer.

5. A process according to Claim 4, in which the suspending agent comprises 50% or more by weight of polyvinyl alcohol.

6. A process of Claim 1, in which the vinylaromatic monomer is selected from the group consisting of styrene, α-methyl styrene, vinyltoluene, chlorostyrene or other ring- or side-chain substituted vinylaromatic monomers and mixtures thereof.

7. A process according to Claim 1, in which the vinylaromatic monomer is styrene.

8. A process according to Claim 1, in which the polymerization is conducted in the presence of copolymerizable nonvinyl aromatic monomers selected from the group consisting of acrylonitrile, methacrylonitrile, methyl acrylate and butadiene or mixtures thereof.

9. A process according to Claim 1, in which the polymerization is conducted in the presence of a volatile blowing agent which becomes incorporated in the bead.

10. A process of Claim 9, wherein the volatile blowing agent is selected from the group consisting of pentane, isopentane, hexane, heptane, cyclopentane, cyclohexane or a petroleum ether boiling within the range of 30° to 70° C. and mixtures thereof.

11. A process of Claim 9, wherein the volatile blowing agent is pentane, being present in an amount of from about 3 to 10% by weight of the monomer.

References Cited
UNITED STATES PATENTS

| | | | |
|---|---|---|---|
| 3,553,112 | 1/1971 | Weinstein et al. | 260—2.5 B |
| 3,505,253 | 4/1970 | Finestone et al. | 260—2.5 B |
| 3,635,852 | 1/1972 | Finestone et al. | 260—2.5 B |
| 3,086,885 | 4/1963 | Jahn | 260—2.5 B |

MORTON FOELAK, Primary Examiner

U.S. Cl. X.R.

260—2.55, 8, 17A, 827, 880

PO-1050
(5/69)

UNITED STATES PATENT OFFICE
CERTIFICATE OF CORRECTION

Patent No. 3,835,073      Dated  September 10, 1974

Inventor(s)   David Everitt Thomas

It is certified that error appears in the above-identified patent and that said Letters Patent are hereby corrected as shown below:

Column 1, line 3, Inventor's name should read - - - David Everitt Thomas - - -

Signed and sealed this 11th day of March 1975.

(SEAL)
Attest:

RUTH C. MASON
Attesting Officer

C. MARSHALL DANN
Commissioner of Patents
and Trademarks